United States Patent
Hegde

(10) Patent No.: US 10,452,095 B2
(45) Date of Patent: Oct. 22, 2019

(54) DUAL WINDOW WATCHDOG TIMER

(71) Applicant: Texas Instruments Incorporated, Dallas, TX (US)

(72) Inventor: Ganapathi Hegde, Bengaluru (IN)

(73) Assignee: Texas Instruments Incorporated, Dallas, TX (US)

(*) Notice: Subject to any disclaimer, the term of this patent is extended or adjusted under 35 U.S.C. 154(b) by 122 days.

(21) Appl. No.: 15/681,206

(22) Filed: Aug. 18, 2017

(65) Prior Publication Data
US 2017/0344052 A1 Nov. 30, 2017

Related U.S. Application Data

(63) Continuation of application No. 14/982,200, filed on Dec. 29, 2015, now Pat. No. 9,740,236.

(30) Foreign Application Priority Data

Mar. 12, 2015 (IN) .......................... 1218/CHE/2015

(51) Int. Cl.
*G06F 1/12* (2006.01)
*G06F 1/06* (2006.01)

(52) U.S. Cl.
CPC . *G06F 1/12* (2013.01); *G06F 1/06* (2013.01)

(58) Field of Classification Search
CPC .. G06F 11/2028; G06F 11/2035; G06F 11/20; G06F 11/0757; G06F 11/1675; G06F 9/4881; G06F 9/4403
See application file for complete search history.

(56) References Cited

U.S. PATENT DOCUMENTS

| 4,538,273 | A | * | 8/1985 | Lasser | G06F 11/0757 714/23 |
| 4,796,211 | A | * | 1/1989 | Yokouchi | G06F 11/0757 714/55 |
| 4,956,807 | A | * | 9/1990 | Hosaka | G06F 11/0757 713/502 |
| 9,336,074 | B2 | * | 5/2016 | Chebruch | G06F 1/04 |

OTHER PUBLICATIONS

Patent Prosecution History for U.S. Appl. No. 14/982,200, from Dec. 29, 2015 to Aug. 2, 2017 (85 pages).

* cited by examiner

*Primary Examiner* — Nadeem Iqbal
(74) *Attorney, Agent, or Firm* — Lawrence J. Bassuk; Charles A. Brill; Frank D. Cimino

(57) ABSTRACT

Systems and methods for a Dual Window Watchdog Timer (DWWDT) are described. In some embodiments, a method may include running a first counter in a first clock domain and a second counter in a second clock domain; generating an interrupt to a controller during a window open period, wherein the window open period begins in response to the first counter having reached a predetermined threshold; and at least one of: restarting the first counter if the controller restarts the second counter in response to the interrupt before the window open period ends; or issuing a system reset if the controller does not restart the second counter in response to the interrupt before the window open period ends.

5 Claims, 2 Drawing Sheets

DUAL WINDOW WATCHDOG TIMER

This application is a continuation of U.S. patent application Ser. No. 14/982,200, filed Dec. 29, 2015, which claims priority under 35 U.S.C. § 119 to Indian patent application 1218/CHE/2015, filed Mar. 12, 2015, both of which are incorporated herein by reference in their entirety.

TECHNICAL FIELD

This specification is directed, in general, to electronic circuits, and, more specifically, to watchdog timers.

BACKGROUND

A watchdog timer (WDT) is a piece of hardware that performs a controlled system restart when an electronic system has failed due to an unexpected software or system delay. The WDT works by generating a system reset when a pre-defined time period has elapsed. In operation, an application software has to reset the WDT's counter within the pre-defined time period to avoid the system reset.

A conventional watchdog timer only detects a "too-late" system response—that is, when an amount of time has passed during which an instruction should have been executed, but it was not. The inventor hereof has recognized, however, that an application software may get stuck within a loop where a restart of the watchdog timer is implemented. In those cases, a conventional watchdog timer is not capable of detecting the error because the restarting of the loop resets the WDT every time. Moreover, a conventional WDT cannot detect certain types of clock failures.

To address these, and other shortcomings, the inventor hereof has developed the various systems and methods for a dual window watchdog timer (DWWDT) that are particularly useful, for example, in automotive applications.

SUMMARY

Systems and methods for a Dual Window Watchdog Timer (DWWDT) are described. In some embodiments, a method may include running a first counter in a first clock domain and a second counter in a second clock domain; generating an interrupt to a controller during a window open period, wherein the window open period begins in response to the first counter having reached a predetermined threshold; and at least one of: restarting the first counter if the controller restarts the second counter in response to the interrupt before the window open period ends; or issuing a system reset if the controller does not restart the second counter in response to the interrupt before the window open period ends.

In some cases, the first clock domain may be faster than the second clock domain. The controller may be in the first clock domain. The interrupt may be generated in response to the first counter having reached a second predetermined threshold. The second predetermined threshold may be larger than the first predetermined threshold. And the interrupt may be generated approximately halfway through the window open period.

The method may further comprise, in response to the first counter having reached a third predetermined threshold larger than the second predetermined threshold, issuing the system reset. The controller may be configured to restart the second counter by performing a write operation during the window open period. The first counter may restart in response to the second counter being restarted. The controller may not restart the second counter in response to the interrupt before the window open period ends due to the first clock domain being slow or the second clock domain being fast.

The method may comprise issuing the system reset if the controller restarts the second counter during a window closed period due to the first clock domain being fast or the second clock domain being slow. The method may further comprising issuing the system reset in response to either the first or second counters failing.

In another illustrative, non-limiting embodiment, an integrated circuit, may include a controller configured to operate in a first clock domain; a first counter configured to operate in the first clock domain; a second counter configured to operate in a second clock domain, wherein the first clock domain is faster than the second clock domain; and a logic circuit configured to: generate an interrupt to the controller during a window open period, wherein the window open period begins in response to the first counter having reached a predetermined threshold; and issue a system reset if the controller does not restart the second counter in response to the interrupt before the window open period ends.

The interrupt may be generated in response to the first counter having reached a second predetermined threshold larger than the predetermined threshold. The logic circuit may be further configured to, in response to the first counter having reached a third predetermined threshold larger than the second predetermined threshold, issuing the system reset. The controller may be configured to restart the second counter by performing a write operation during the window open period. The first counter restarts in response to the second counter being incremented after the second counter is restarted.

In yet another illustrative, non-limiting embodiment, an integrated circuit may include a controller configured to operate in a first clock domain; a first counter configured to operate in the first clock domain; a second counter configured to operate in a second clock domain, wherein the first clock domain is faster than the second clock domain; and a logic circuit configured to: generate an interrupt to the controller during a window open period, wherein the window open period begins in response to the first counter having reached a predetermined threshold; and restart the first counter if the controller restarts the second counter in response to the interrupt before the window open period ends.

The interrupt may be generated in response to the first counter having reached a second predetermined threshold larger than the predetermined threshold. The controller may be configured to restart the second counter by performing a write operation during the window open period, and the first counter may restart in response to the second counter being incremented after the second counter is restarted.

BRIEF DESCRIPTION OF THE DRAWINGS

Reference will now be made to the accompanying drawings, wherein.

DETAILED DESCRIPTION

Embodiments now will be described more fully hereinafter with reference to the accompanying drawings. The systems and methods described herein may, however, be embodied in many different forms and should not be construed as limited to the implementations set forth herein. Rather, these embodiments are provided so that this disclosure will be thorough and complete. A person of ordinary skill in the art would be able to make and use the various embodiments described herein.

Figure 1:
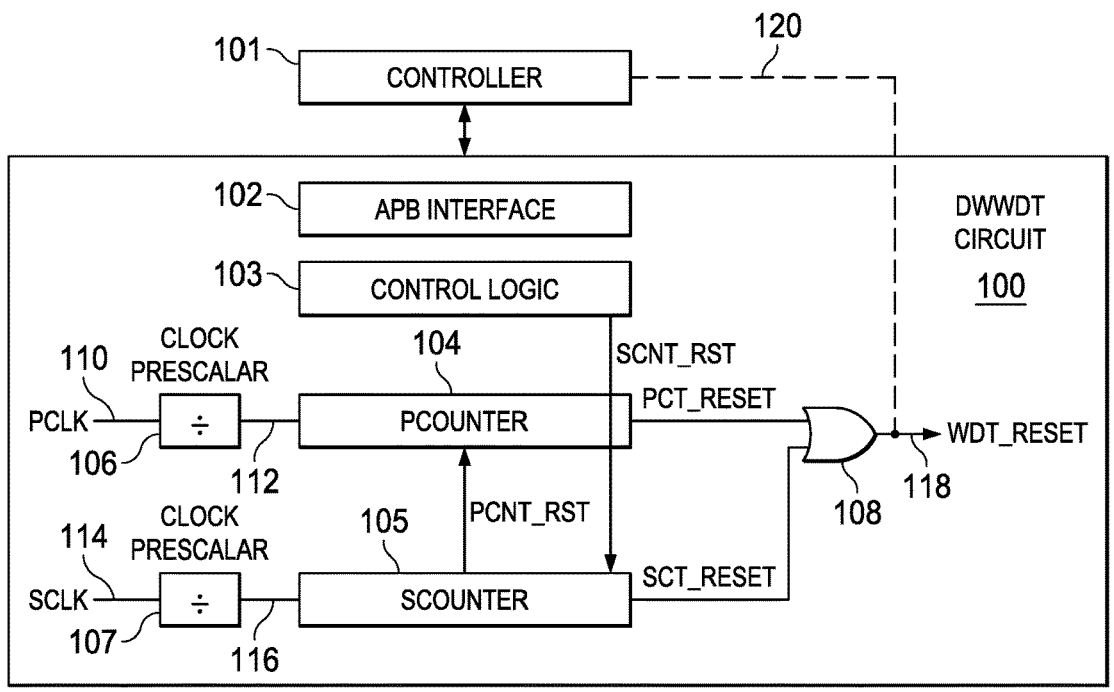
FIG. 1 is a block diagram of an example of a Dual Window Watchdog Timer (DWWDT) circuit according to some embodiments.

FIG. 1 is a block diagram of an example of a Dual Window Watchdog Timer (DWWDT) circuit 100 according to some embodiments. Particularly, controller or Central Processing Unit (CPU) 101 is coupled to DWWDT circuit 100, in this case, via Advanced Peripheral Bus (APB) interface 102. Control logic 103 includes circuits and/or routines for implementing the DWWDT based upon two counters: first counter 104 (PCOUNTER) and second counter 105 (SCOUNTER).

A first clock signal PCLK on lead 110 from a first clock domain is received at first clock pre-scalar block 106, which provides a clock signal on lead 112 proportional to the first clock signal to PCOUNTER 104. A second clock signal SCLK on lead 114 from a second clock domain is received at second clock pre-scalar block 107, which provides a clock signal on lead 116 proportional to the second clock signal to SCOUNTER 105. The first and second clock signals may be independent from each other (e.g., based upon independent sources). In some cases, the first clock domain may be the same domain under which controller 101 operates, and the second clock domain may have a slower frequency that the first clock signal.

The second counter SCOUNTER 105 can be restarted by control logic 103 (using the "SCNT_RST" signal) and the first counter PCOUNTER 104 can be restarted by the second counter SCOUNTER 105 (using the "PCNT_RST" signal). PCOUNTER 104 and SCOUNTER 105 are also configured to provide resetting signals PCT_RESET and SCT_RESET, respectively, to OR gate 108; the output of which provides a system reset signal WDT_RESET 118. In some implementations, WDT_RESET 118 may be configured to reset controller 101, represented through dashed line lead 120.

In some implementations, PCOUNTER 104 and SCOUNTER 105 may each be a 16-bit timer, or the like. In operation, PCOUNTER 104 generates an interrupt to controller 101 in the middle of a "Window Open" period when PCOUNTER 104 reaches a programmed threshold. As used herein, the term "window open" may refer to a period of time during which PCOUNTER 104 must be restarted in order to avoid a system reset (e.g., controller 101 is allowed to write to a reload register). Controller 101 is then expected to reset SCOUNTER 105 before the window closes by writing to the reload register. Conversely, the term "window closed" may refer to a length of time preceding and/or following the window open period during which the PCOUNTER 104 cannot be restarted, otherwise it will also cause a system reset (e.g., controller 101 is not allowed to write to the reload register). The timings of window closed and window open may be adjusted based on the accuracy of the system clock across a given voltage and temperature range.

In various embodiments, the following scenarios may result in the DWWDT circuit 100 issuing a reset by asserting the WDT_RESET signal: (a) controller 101 fails to clear SCOUNTER 105 and SCOUNTER 105 crosses the end of the window open period (reset threshold), which may occur when controller 101 is hung, PCLK is too slow or SCLK is too fast; (b) controller 101 resets SCOUNTER 105 while in the window closed state, which may occur when PCLK is too fast or SCLK is too slow; (c)☐when SCLK fails (e.g., stuck to low or high) it causes PCOUNTER 104 to reach its maximum value and a reset is generated; and (d) when PCLK fails, SCOUNTER 105 will reach its maximum value and a reset is also generated.

Figure 2:
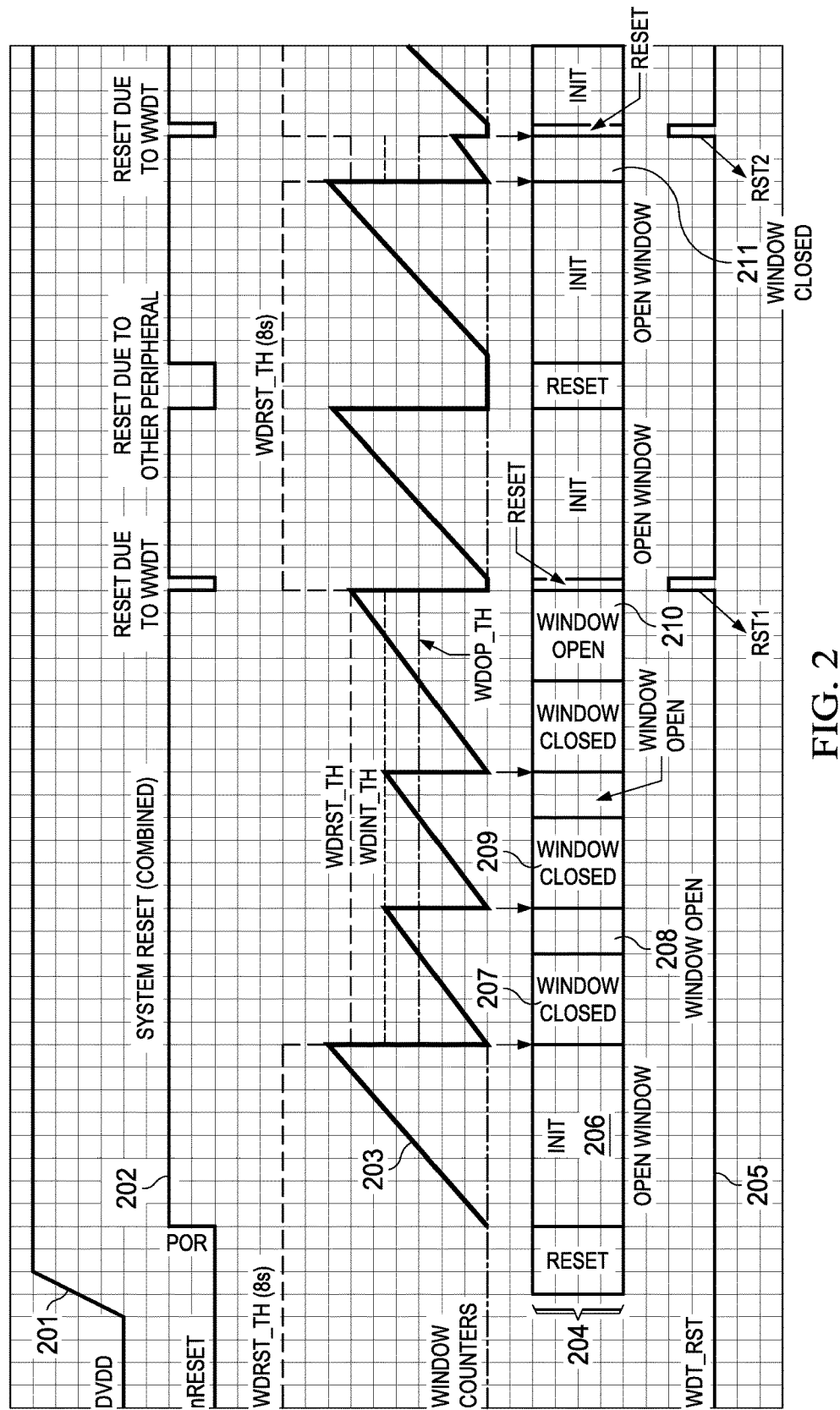
FIG. 2 is a graph generally illustrating the operation of a DWWDT according to some embodiments.

FIG. 2 is a graph generally illustrating the operation of DWWDT circuit 100 according to some embodiments. Curve 201 shows a power supply or rail being provided to DWWDT circuit 100 or controller 101, and curve 202 shows reset events: a first "Power-On-Reset" (POR) event or system reset, followed by a second reset due to operation of the DWWDT circuit 100, then a third reset due to another peripheral or other causes, and a fourth reset also due to operation of DWWDT circuit 100. Window counters 203 are discussed and window events 204 are discussed in more detail below. Resetting signal WDT_RST 205 is also shown, with pulses representing the first DWWDT reset (where CPU or controller 101 did not re-load the counter before the window open period ended) and the second DWWDT reset (where CPU or controller 101 re-loaded the counter while the window closed period was still being enforced).

To better understand window counters 203 and status 204, consider the following scenario: the DWWDT has PCOUNTER 104 running in controller 101 clock domain and SCOUNTER 105 in a slower clock domain. Both counters are capable of generating reset to the system on clock failure or frequency deviation beyond the programmed value. Each counter has its window status: reset, initialization, window closed, and window open. The reset status indicates that the counter has been reset.

The first window after the POR reset is called "Initialization" or "Init" window 206 during controller 101 can write to watchdog registers any time. This is the maximum length window and is an open window. The application software is expected to program the watchdog configuration registers during this window.

The configuration register may, in some examples, be written only during the initialization window after every reset. After initializing the watchdog, controller 101 is expected to re-load the counter by writing to a <Counter Reload> register. On reload, the window status changes to a "window closed" state 207 where no register writes are accepted. The watchdog response to the write when window closed is programmable and can be configured during initialization. For example, a typical response may be to reset the system.

Once PCOUNTER 104 reaches a first threshold WDOP_TH, the window is open 208 for controller 101 to write to the reload the register. When PCOUNTER 104 reaches a second threshold WDOP_INT_TH, an interrupt to controller 101 is issued. As soon as controller 101 writes to the reload register, the window status changes back to "window closed" state 209, and this sequence repeats itself.

In some implementations, such an interrupt may be issued in the middle of the maximum window open period. Controller 101 is expected to respond to the interrupt and write to the reload register during the window open period 208. When the reload register is written, only the SCOUNTER 105 in slow clock domain gets restarted to zero.

Therefore, clock frequency failures, frequency deviation, and run away situations (e.g., due to bug, stack corruption or any other soft errors) may be monitored through an interrupt generation and controller 101's response to the interrupt—the response being the reloading or restarting the slow counter 105 during a window open period. Such a cross-coupling of the two counters provides, among other things, a mechanism through which PCOUNTER 104 in controller 101's clock domain monitors the health of SCOUNTER 105 in the slow clock domain (or the slow clock failure), and is described in more detail in connection with FIG. 3 below.

Particularly, SCOUNTER 105, in the slow clock domain, runs independently and gets re-loaded by controller 101 when window is written during a 'window open' status. PCOUNTER 104, in the fast clock domain, gets reloaded when SCOUNTER 105 transitions between different two preselected values (e.g., from 0 to 1) as the counter is incremented.

If controller 101 does not write to the reload register during window open period 210 (that is, it's "too-late"), PCOUNTER 104 reaches third threshold value WDRST_TH which results in system reset event "RST1." Conversely, if controller 101 writes to the reload register when the window is closed 211 (that is, it's "too-early"), it results in system reset event "RST2."

Figure 3:
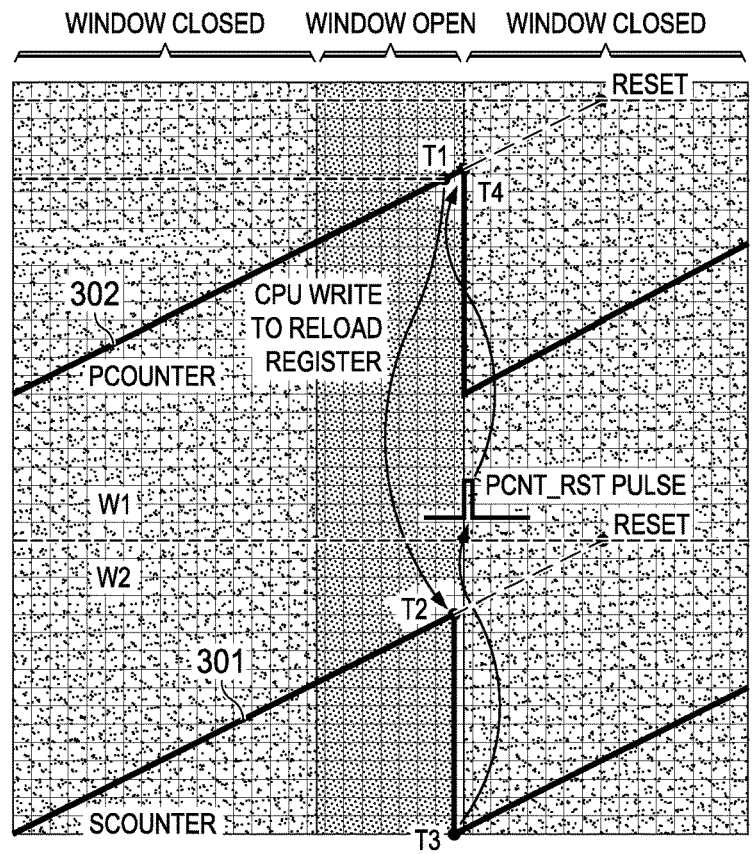
FIG. 3 is a graph illustrating an example of a cross-coupling between two windows in different clock domains according to some embodiments.

FIG. 3 is a graph illustrating an example of a cross-coupling between two windows in different clock domains according to some embodiments. Particularly, at time T1 during a window open period PCOUNTER 302 crosses the WDOP_INT_TH threshold, and an interrupt is issued. In various embodiments, T1 may occur halfway through the maximum window open period.

In response, at time T2, controller 101 restarts SCOUNTER 301 by writing to the register. Then, at time T3, SCOUNTER 301 resets to zero in response to controller 101 writing to the register. SCOUNTER 301 also, in response to controller 101 writing to the register generates a PCNT_RST pulse which restarts PCOUNTER 302 at time T4, thus beginning a new window closed period.

In sum, DWWDT circuit 100 as described herein further enhances a watchdog module to issue a reset when clock failure is detected. The watchdog issues a reset to the system when one of the two clocks fails or deviates beyond certain frequency threshold in the system. Among other features, DWWDT circuit 100 issues a system reset when☐controller 101 is not responding, controller clock is too-fast or too-slow, the slow clock is too-fast or too-slow, fast clock failure, and/or slow clock failure.

Although particular implementations described herein use two 16-bit counters to implement PCOUNTER 104 and SCOUNTER 105, it should be noted that other types of counters may be used. Furthermore, the various window sizes and thresholds are programmable, as are clock pre-scalars 106 and 107

In various embodiments, PCOUNTER 104 and SCOUNTER 105 may be stopped when the chip enters sleep mode and re-starts on wake up. Moreover, in some cases, the systems and methods described herein may implement register write protection from rogue software with a pseudo-random key technique or other suitable write protection scheme.

In some examples, a system may include a controller (or CPU) 101 having a clock input that is coupled to a first clock output of a clock generator. The system may further include a first counter 104 having a clock input that is coupled to the first clock output of the clock generator (e.g., coupled via clock prescalar 106). The system may further include a second counter 105 having a clock input that is coupled to a second clock output of the clock generator (e.g., coupled via clock prescalar 107). A frequency of a first clock signal provided by the clock generator at the first clock output may be greater than a frequency of a second clock signal provided by the clock generated at the second clock output.

The clock generator may be configured to generate the first and second clock signals at the first and second clock outputs, respectively, such that the frequency of the first clock signal is greater than the frequency of the second clock signal. In some examples, the clock generator may include first and second clock generation circuits. The first clock generation circuit may include the first clock output and be configured to generate the first clock signal at the first clock output. The second clock generation circuit may include the second clock output and be configured to generate the second clock signal at the second clock output.

In some examples, the system may further include reset logic (e.g., OR gate 108). In such examples, the first counter may include a controller reset output coupled to a first input of the reset logic, the second counter may include a controller reset output coupled to a second input of the reset logic, and an output of the reset logic may be coupled to a reset input (or watchdog timer interrupt input) of controller 101.

In some examples, the system may include control logic having a reset output coupled to a counter reset input of the second counter. A counter reset output of the second counter may be coupled to a counter reset input of the first counter. The first counter may also include an interrupt output that is coupled to an interrupt input of controller 101.

The first counter may generate an interrupt signal at the interrupt output in response to a counter value of the first counter exceeding a threshold. The threshold may be between an initial counter value corresponding to a beginning of a window period and an end counter value corresponding to an end of the window period. Controller 101 may generate a reset signal at a reset output of controller 101 in response to receiving the interrupt, and provide the reset signal to the second counter (e.g., via control logic 103). In response to the second counter receiving the reset signal, the second counter may reset the counter value of the second counter to an initial value, and issue a reset signal to the first counter via the counter reset output. In response to the first counter receiving the reset signal from the second counter, the first counter may reset the counter value of the first counter to an initial value.

In some examples, the first counter may issue a controller reset signal via the controller reset output of the first counter in response to: (a) receiving a reset signal from the second counter prior to the counter value of the first counter exceeding a first threshold that corresponds to a beginning of the window open period; or (b) the counter value of the first counter exceeding a second threshold value that corresponds to an end of the window open period. Similarly, the second counter may issue a controller reset signal via the controller reset output of the second counter in response to: (a) receiving a reset signal from the controller and/or control logic prior to the counter value of the second counter exceeding a first threshold that corresponds to a beginning of the window open period; or (b) the counter value of the second counter exceeding a second threshold value that corresponds to an end of the window open period.

In some examples, the first counter may increment a counter value of the first counter based on the first clock signal (e.g., in response to one or more transitions in the first clock signal), and the second counter may increment a counter value of the second counter based on the second clock signal (e.g., in response to one or more transitions in the second clock signal).

In some examples, a watchdog timer circuit includes first counter 104 having a clock input that is coupled to the first clock input of the watchdog timer circuit, and second counter 105 having a clock input that is coupled to a second clock input of the watchdog timer circuit. The watchdog timer circuit may further include reset logic (e.g., OR gate 108) having a first input coupled to a controller reset output of the first counter, a second input coupled to a controller reset output of the second counter, and an output coupled to a controller reset output (or watchdog timer interrupt output) of the watchdog timer circuit. The first counter may include an interrupt output coupled to an interrupt output of the watchdog timer circuit. The second counter may include a counter reset output that is coupled to a counter reset input of the first counter. The second counter may further include a reset counter input that is coupled to a counter reset input of the watchdog timer circuit (e.g., coupled via control logic 103).

It should be understood that the various operations described herein may be implemented by processing circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

A person of ordinary skill in the art will appreciate that the various circuits depicted above are merely illustrative and is not intended to limit the scope of the disclosure described herein. In particular, a device or system configured to perform audio power limiting based on thermal modeling may include any combination of electronic components that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other circuit configurations.

It will be understood that various operations discussed herein may be executed simultaneously and/or sequentially. It will be further understood that each operation may be performed in any order and may be performed once or repetitiously.

Many modifications and other embodiments will come to mind to a person of ordinary skill in the art to which such embodiments pertain having the benefit of the teachings presented in the foregoing descriptions, and the associated drawings. Therefore, it is to be understood that the embodiments are not to be limited to the specific implementations disclosed. Although specific terms are employed herein, they are used in a generic and descriptive sense only and not for purposes of limitation.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An integrated circuit comprising:
    (a) a first clock signal lead and a second clock signal lead;
    (b) a first counter having a clock input coupled to the first clock signal lead, a PCOUNTER count reset input, and a PCOUNT reset output;
    (c) a second counter having a clock input coupled to the second clock signal lead, an SCOUNTER count reset input, a PCOUNTER count reset output coupled to the PCOUNTER count reset input, and an SCOUNT reset output;
    (d) control logic having an SCOUNTER count reset output coupled to the SCOUNTER count reset input; and
    (e) a logic gate having an input coupled to the PCOUNT reset output, an input coupled to the SCOUNT reset output, and a watchdog timer reset output.

2. The integrated circuit of claim 1 including a first clock prescalar having an input coupled to the first clock signal lead and an output coupled to the clock input of the first counter.

3. The integrated circuit of claim 1 including a second clock prescalar having an input coupled to the second clock signal lead and an output coupled to the clock input of the second counter.

4. The integrated circuit of claim 1 including a controller having an input coupled to the watchdog timer reset output.

5. The integrated circuit of claim 1 in which the logic gate is a logical OR gate.

\* \* \* \* \*